UNITED STATES PATENT OFFICE.

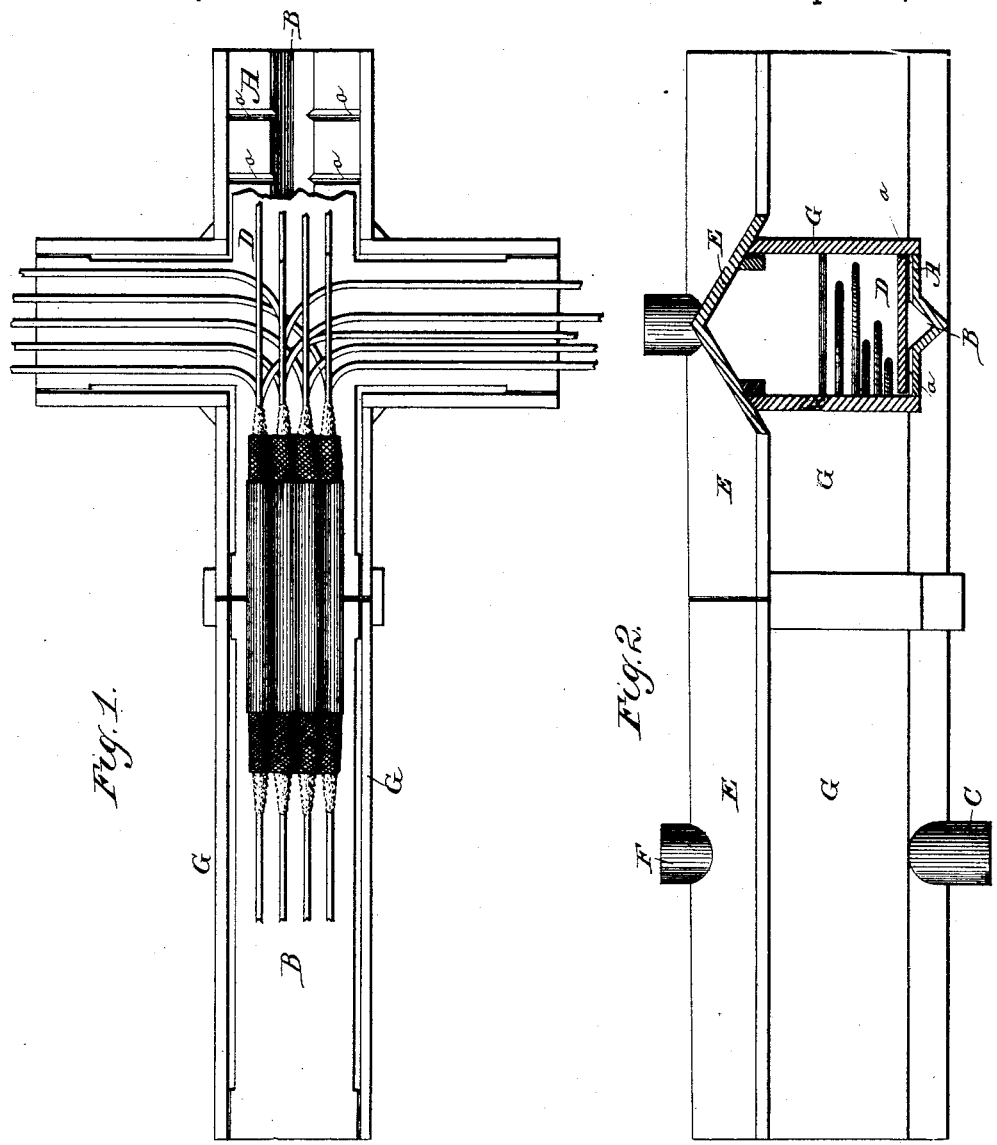

JAMES MACKINTOSH, OF PHILADELPHIA, PENNSYLVANIA.

CONDUIT FOR UNDERGROUND ELECTRIC WIRE CABLES.

SPECIFICATION forming part of Letters Patent No. 264,722, dated September 19, 1882.

Application filed June 16, 1882. (No model.)

*To all whom it may concern:*

Be it known that I, JAMES MACKINTOSH, a citizen of the United States, residing at Philadelphia, in the county of Philadelphia, State of Pennsylvania, have invented new and useful Improvements in Conduits for Underground Electric Wire Cables, of which the following is a specification, reference being had to the accompanying drawings, in which—

Figure 1 is a plan view of the conduit having the cover removed and a portion of the false bottom broken away. Fig. 2 is a side elevation, partly in section.

My invention relates to underground conduits.

The object of my invention is to so construct a conduit that any dampness from sweating or any water that may enter the conduit will follow grooves $a$, made in the bottom A, and enter the drain B, and be discharged through the drainage-tube C, which may lead into the earth or a culvert, thereby preventing any accumulation of water in the conduit, the false bottom D being constructed so as to allow free passage of the water between it and the sides of the conduit into the grooves made in the bottom A. The ventilation of the conduit is obtained by attaching a pipe to the collar F, which may be placed in the sides G or in the cover E, as the locality of the conduit may seem to require, or where electric streetlights are used as one of the means of ventilation. The conduit can be made of any material that will retain its shape, it being more particularly designed to hold square cables. A conduit one foot square, inside measurement, will hold a block of cables ten by eleven containing between seventeen hundred and twenty-five hundred wires, and have an inch space all around for the purpose of handling the cables and for ventilation and drainage without the water coming in contact with the cables.

I so construct the cover that it can be removed and replaced at any part of the conduit for the purpose of connecting branch cables or relaying or repairing the same. Strips are provided on the inside of the cover E, which will hold the cover in place and enable it to be water-tight by placing strips of gum or a waterproof cement on the edge of sides G and pressing it together.

Having fully described my invention, what I desire to claim and secure by Letters Patent is—

The underground conduit for electric wires, having the interior of its bottom provided with the drain B, extending longitudinally in the direction of the conduit, and having side or lateral grooves extending therefrom and to the sides of the conduit, in combination with the false bottom D, as described, whereby a free passage is formed between it and the conduit for the passage of the drain-water, as set forth.

JAMES MACKINTOSH.

Witnesses:
JAMES H. COX,
CHARLES BAEGLER.